US008493868B2

(12) United States Patent
Nguyen et al.

(10) Patent No.: US 8,493,868 B2
(45) Date of Patent: Jul. 23, 2013

(54) TRAFFIC LOAD MANAGEMENT

(76) Inventors: Viet-Hung Nguyen, Saint-Mande (FR); Hartman Van Wyk, Montloius sur Loire (FR)

( * ) Notice: Subject to any disclaimer, the term of this patent is extended or adjusted under 35 U.S.C. 154(b) by 0 days.

(21) Appl. No.: 13/365,106

(22) Filed: Feb. 2, 2012

(65) Prior Publication Data
US 2013/0121151 A1 May 16, 2013

Related U.S. Application Data

(63) Continuation of application No. PCT/US2012/023093, filed on Jan. 30, 2012.

(51) Int. Cl.
H04J 3/14 (2006.01)
(52) U.S. Cl.
USPC .......................................... 370/236; 370/345
(58) Field of Classification Search
None
See application file for complete search history.

(56) References Cited

U.S. PATENT DOCUMENTS

| 7,978,725 | B2 | 7/2011 | Gong et al. | |
|---|---|---|---|---|
| 2004/0090943 | A1* | 5/2004 | da Costa et al. | 370/338 |
| 2008/0001205 | A1 | 1/2008 | Endo | |
| 2008/0089390 | A1 | 4/2008 | Picard | |
| 2012/0052864 | A1* | 3/2012 | Swaminathan et al. | 455/436 |

FOREIGN PATENT DOCUMENTS

| KR | 1020110039858 | 4/2011 |
|---|---|---|
| KR | 20110078765 | 7/2011 |
| WO | WO2008001205 | 1/2008 |

OTHER PUBLICATIONS

The Extended European Search Report mailed Jan. 12, 2012 for European patent application No. 11188907.7, 6 pages.
Hussain et al., "Dynamic Contention Window for Quality of Service in IEEE 802.11 Networks," National Conference on Emerging Technologies, 2004, pp. 12-16.
The PCT Search Report mailed Oct. 4, 2012 for PCT application No. PCT/US12/23093, 9 pages.
Revolution Wi-Fi, The Wireless Professional's Connection for Independent Analysis, retrieved on Feburary 10, 2012 at <<http://revolutionwifi.blogspot.com/2010/08/wireless-gos-part-5-contention-window.html>>, 12 pages.
Freaklabs—Open Source Wireless, IEEE 802.15.4 in the context of Zigbee—Part 2, Dec. 14, 2008, 8 pages.
Wireless Medium Access Control, IEEE 802.15.4, Speaker Chun-Yi Chen, Sep. 7, 2007, 40 pages.

\* cited by examiner

*Primary Examiner* — Jianye Wu
(74) *Attorney, Agent, or Firm* — Lee & Hayes, PLLC

(57) ABSTRACT

A node may assist in the management of upstream network traffic in part by managing a contention window used by the node. The node may maintain a list of size(s) of contention window(s) of parent node(s) of the node. The node may set its own contention window to be longer (i.e., a longer period of time) than that of upstream neighbor nodes. With a longer contention window than that of its parent node(s), the node will refrain from using an RF channel needed by a parent node. Accordingly, upstream nodes are better able to transmit any backlog of data before receiving additional data from downstream nodes. This may better distribute data over the network, and may better manage data flow.

20 Claims, 6 Drawing Sheets

TRAFFIC LOAD MANAGEMENT

This application is a continuation of, and claims priority to, PCT International Application No. PCT/US 12/23093, filed Jan. 30, 2012, which claims foreign priority to European Application No. 11188907.7, filed on Nov. 11, 2011, both of which are incorporated herein by reference.

BACKGROUND

A mesh network may include a plurality of nodes, many of which may include software producing data for transmission. Many of the nodes may also have associated devices, including sensors, meters, etc., which may gather data. Collectively, the nodes may generate a considerable amount of data to be sent upstream to a root node for transmission to a central office.

Existing networks and systems create bottle necks at certain upstream nodes, resulting in transmission delays and quality of service issues. A second problem of existing systems involves fair and effective division of the available bandwidth between nodes in the network and software running on those nodes.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Figure 1:
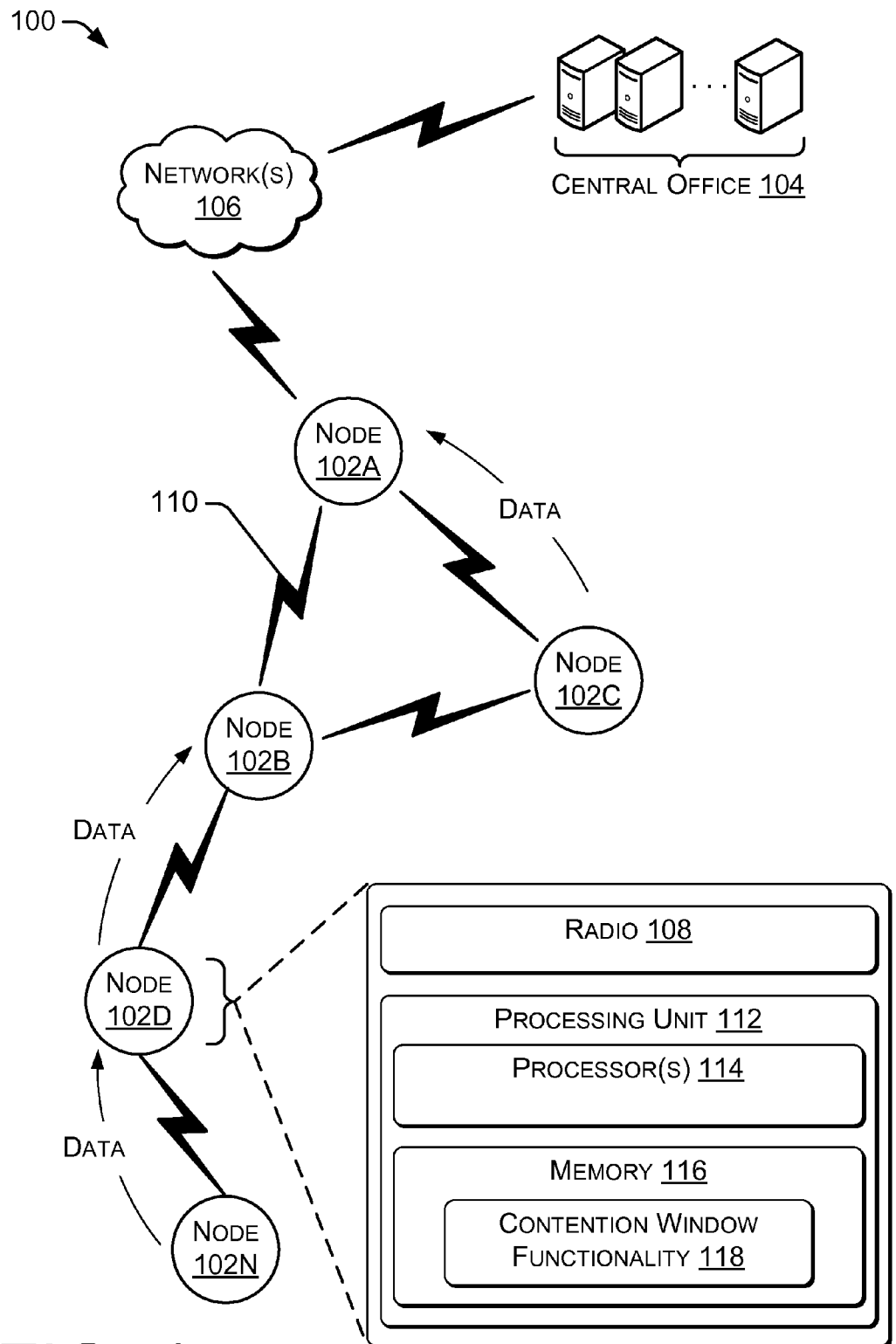
FIG. 1 is a diagram showing a network having a plurality of nodes, some detail of one node, a connection to a further network such as the Internet, and a central office.

As discussed above, existing networks do not provide an effective way of managing uplink network traffic in a network, such as a multi-channel wireless mesh network. A particular problem in existing networks is that traffic among nodes may increase for nodes nearer the root node. This increase may result in a bottleneck, which may degrade network performance. A number of factors may be to blame. For example, existing networks may include nodes having longer contention windows that do not allow them to compete for bandwidth and process data at a rate required, based on the data that they receive from downstream nodes. As used herein, a "contention window" refers to a period of time during which a node waits to transmit, upon cessation of radio frequency (RF) signals on a particular channel, before transmitting. Thus, because different nodes have contention windows of different lengths, the contention windows provide a "staggered start," wherein one node is permitted to start RF transmission before other nodes, thereby forcing the other nodes waiting to transmit to suspend a timeout calculation of their own contention windows. Accordingly, contention windows are part of a collision avoidance system in wireless networks.

This disclosure describes techniques for providing traffic load management for uplink network traffic. Uplink network traffic may include data flowing from node to node within a mesh network in an upstream direction, i.e., toward a root node. The network, nodes and data may include, for example, smart utility meters (e.g., electric, gas, and/or water meters), sensors (e.g., temperature sensors, weather stations, frequency sensors, etc.), control devices, transformers, routers, servers, relays (e.g., cellular relays), switches, valves, and other network devices and the data generated and/or transmitted from any of the preceding. From the root node, the data may be transferred to a further network for transport to a central office. For example, the root node may be configured as a cellular router within a context of an autonomous routing area (ARA) of utility smart meters, may receive data from the mesh network, and may transmit that data to servers within the Internet for transfer to a central office, server or other desired location.

An example illustrating some of the techniques discussed herein—not to be considered a full or comprehensive discussion—may assist the reader. A node may assist in the management of upstream network traffic in part by managing a contention window used by the node. When transmission on a channel stops (i.e., when no radio frequency (RF) signal is presently heard) nodes desiring to begin transmission must each wait until expiration of their own contention windows. A node having a shortest contention window is able to start transmission first, thereby preventing other nodes from transmitting. Accordingly, length of a contention window is a factor governing traffic on an RF network, such as a mesh network comprising a plurality of nodes, which may be configured as an ARA of utility smart meters.

Within the above example, a node may assist in the management of upstream network traffic in part by managing a contention window used by the node. The node may maintain a list of size(s) of contention window(s) of parent node(s) of the node. The node may set its own contention window to be longer (i.e., a longer period of time) than upstream neighbor nodes and/or parent nodes. With a longer contention window than its parent node(s), the node will refrain from using an RF channel needed by a parent node. That is, parent nodes will generally have a higher priority (i.e., shorter contention window size) than their child nodes. Accordingly, upstream nodes are better able to transmit any backlog of data before receiving additional data from downstream nodes. This may better distribute data over the network, and may better manage data flow.

The discussion herein includes several sections. Each section is intended to be non-limiting. More particularly, this entire description is intended to illustrate components and techniques which may be utilized in uplink network traffic load management, but not components and techniques which are necessarily required. The discussion begins with a section entitled "Example Network Architecture," which describes an ARA, including smart utility meters and other devices as a representative environment that may implement the techniques described herein. Next, a section entitled "Example Node Configuration" illustrates and describes an example configuration for a node usable in a network such as an ARA and which provides uplink network traffic load management. Next, a section entitled "Example Contention Window Operation" illustrates and describes an example of contention window techniques that provide uplink network traffic load management. Further sections, entitled "Example Methods" and "Example Uplink Network Traffic Load Management Methods" illustrate and describe techniques that may be used to manage contention windows within nodes and to provide uplink network traffic load management. Finally, the discussion ends with a brief conclusion.

This brief introduction, including section titles and corresponding summaries, is provided for the reader's convenience and is not intended to describe and/or limit the scope of the claims or any section of this disclosure.

Example Network Architecture

FIG. 1 is a schematic diagram showing example architecture 100 of a network, such as for example a multi-channel, wireless mesh network, in which uplink transmissions can be routed at least in part according to contention windows set at each node according to prescribed techniques described herein. The architecture 100 includes a plurality of nodes 102A, 102B, 102C, 102D, . . . 102N (collectively referred to as nodes 102) communicatively coupled to each other via direct communication radio frequency (RF) signals, transmissions or links. In this example, N represents an example number of nodes in an autonomous routing area (ARA), which may be configured as a wide area network (WAN), metropolitan area network (MAN), local area network (LAN), neighborhood area network (NAN), personal area network (PAN), or the like.

As discussed above, the term "contention window" refers to a waiting period that a node must wait, after transmission on a channel is ended by another node, and before the node may begin its own transmission. If another node begins transmission prior to the end of the node's contention window, the node must suspend a countdown associated with its own contention window, and let the other node use the channel. In a multichannel environment, each of the plurality of channels may be defined by a frequency range which is the same or different for each of the plurality of channels, and each channel may be centered about a different frequency. In some instances, the plurality of channels comprises RF channels, typically having a frequency width appropriate to an anticipated modulation and environmental condition(s). The plurality of channels may comprise a control channel and multiple data channels. In some instances, the control channel is utilized for communicating one or more short messages between nodes to specify one of the data channels to be utilized to transfer data. Additionally, the control channel may be utilized by a plurality of nodes to transmit information indicating their contention window length. The length of the contention window may be expressed as a period of time, a number of time "slots," or any other agreed upon technique. Generally, transmissions on the control channel are shorter relative to transmissions on the data channels.

In the example of FIG. 1, the nodes 102 are also configured to communicate with a central office 104 via a root node, such as an edge device (e.g., cellular relay, cellular router, edge router, DODAG root, etc.), that serves as a connection point of the ARA to a backhaul network(s) 106, such as the Internet or an intranet. The central office 104 may be implemented by one or more computing devices, such as servers, personal computers, laptop computers, etc. The one or more computing devices may be equipped with one or more processor(s) communicatively coupled to memory. In some examples, the central office 104 includes a centralized meter data management system which performs processing, analysis, storage, and/or management of data received from one or more of the nodes 102. For instance, the central office 104 may process, analyze, store, and/or manage data obtained from a smart utility meter, sensor, control device, router, regulator, server, relay, switch, valve, and/or other nodes. Although the example of FIG. 1 illustrates the central office 104 in a single location, in some examples the central office may be distributed amongst multiple locations and/or may be eliminated entirely (e.g., in the case of a highly decentralized distributed computing platform).

The network(s) 106 may comprise a wireless or a wired network, or a combination thereof, and may be a collection of individual networks interconnected with each other and functioning as a single large network. In the illustrated example, the node 102A serves as a root node, configured as a cellular relay to relay communications to and/or from the other nodes 102B-102N of the ARA to and/or from the central office 104 via the network(s) 106.

The node 102D is representative of each of the nodes 102 and includes a radio 108, configured for communication by means of RF signals 110, and a processing unit 112. The radio 108 comprises a radio frequency (RF) transceiver configured to transmit and/or receive RF signals via one or more of a plurality of channels/frequencies. In some implementations, each of the nodes 102 includes a single radio 108 configured to send and receive data on multiple different channels, such as the control channel and multiple data channels of each communication link 110. The radio 108 may also be configured to implement a plurality of different modulation techniques, data rates, protocols, signal strengths, and/or power levels. Additionally, the radio may be configured to sequentially tune a plurality of different frequencies, each for a short period of time, in a "frequency hopping" scheme. The architecture 100 may represent a heterogeneous network of nodes, in that the nodes 102 may include different types of nodes (e.g., smart meters, cellular relays, sensors, etc.), different generations or models of nodes, and/or nodes that otherwise are capable transmitting on different channels and using different modulation techniques, data rates, protocols, signal strengths, and/or power levels.

The processing unit 112 may include one or more processor(s) 114 communicatively coupled to memory 116. The processor 114 may execute, and the memory 116 may contain, various modules, managers, algorithms, etc. The modules may be configured in software and/or firmware, and may be executable on the processor. In alternative embodiments, any or all of the modules may be implemented in whole or in part by hardware. Examples of hardware include a microcontroller or other digital device, such as an application specific integrated circuit (ASIC) or other device configured to execute the described functions.

The memory 116, while shown as a monolithic entity, may also be configured as a plurality of differently configured devices, such as read-only memory, writable memory, persistent or non-persistent memory, etc. The memory 116 may be configured to store one or more software and/or firmware modules, which are executable on the processor(s) 114 to implement various functions.

The memory 116 may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented according to any technology or techniques for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

Contention window functionality 118 may be defined in memory 116 and maintained by actions of the processor 114. The contention window information may include information about the duration of contention windows of upstream neighbors of the node 102D. According to techniques discussed infra, the contention window functionality 118 may operate to select a contention window for the node 102D that is longer than contention windows of upstream 1-hop neighbors. The use of a contention window in node 102D that is longer than upstream neighbors (e.g., node 102B) assists the network 100 to eliminate bottlenecks in transmission.

Example Node Configuration

Figure 2:
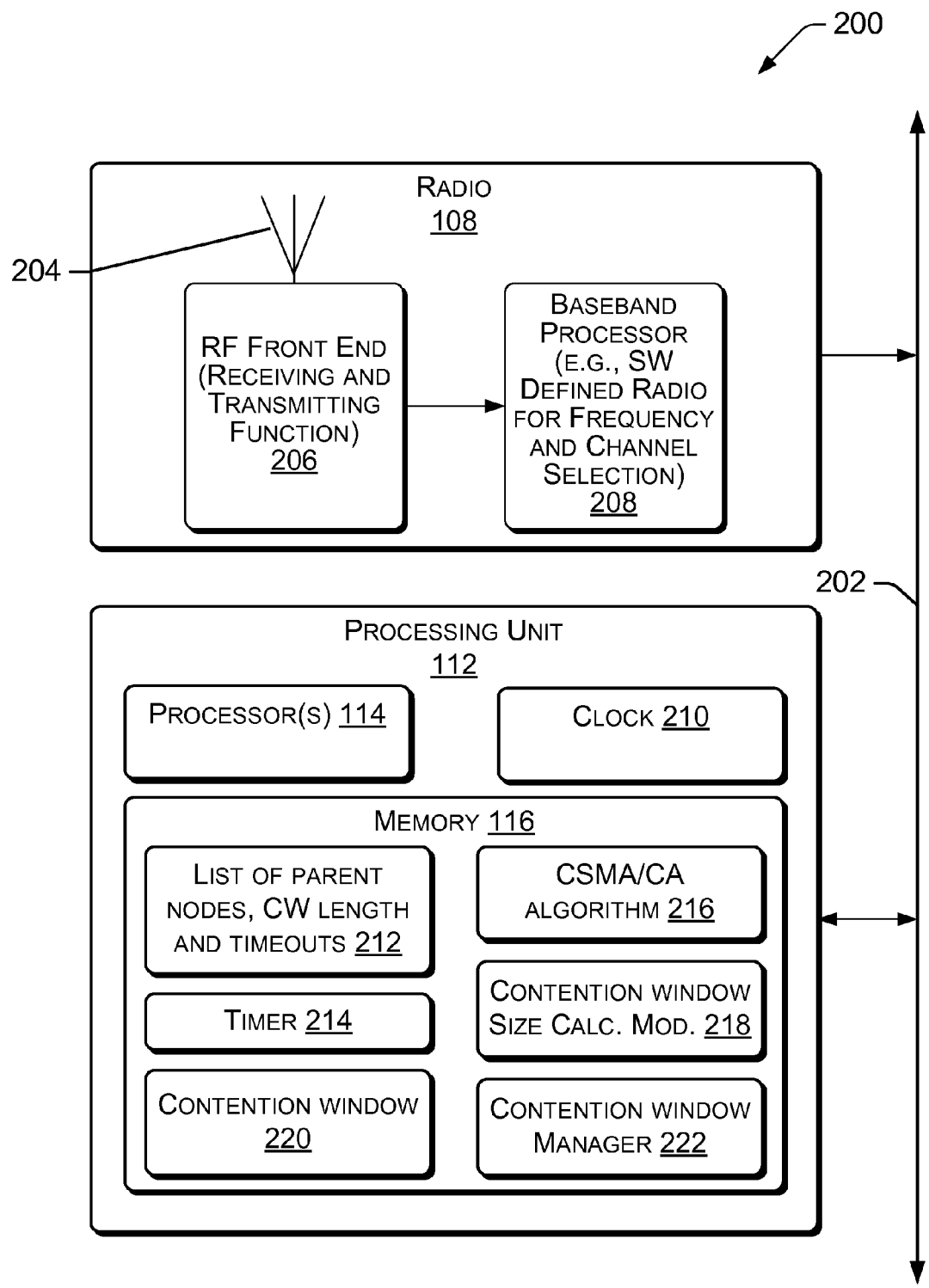
FIG. 2 is a diagram showing example detail of an individual node.

FIG. 2 is a diagram showing additional detail of an individual example node 200. The node may be configured to provide traffic load management for uplink network traffic. Uplink network traffic may include data flowing from node to node within a mesh network in an upstream direction, i.e., toward a root node.

The node 200 may be configured to assist in the management of upstream network traffic in part by managing a contention window used by the node. When transmission on a channel stops (i.e., when no radio frequency (RF) signal is presently heard) nodes desiring to begin transmission must each wait until expiration indicated by their own contention windows. A node having a shortest contention window is able to start transmission first (assuming it has data to transmit), and its transmission has the effect of preventing other nodes from transmitting. If the node having the shortest contention window does not have any data to transmit, a node with a next shortest contention window size will have an opportunity to transmit, and so forth. Accordingly, length of a contention window is a factor governing traffic on an RF network, such as a mesh network comprising a plurality of nodes, which may be configured as an ARA of utility smart meters.

The radio 108 may be configured for communication with a processing unit 112 over a communications bus 202. In the example configuration of FIG. 2, the radio may include an antenna 204 providing an input signal to an RF front end 206. The RF front end 206 may be configured to tune an RF signal from among many provided by the antenna 204, and provide a baseband signal to the baseband processor 208.

The RF front end 206 may be configured using high frequency hardware components to tune one or more frequencies of RF signals obtained from nodes within the network. In an analog (or mixed analog and digital) configuration, the RF front end 206 may be configured as a radio or transceiver using conventional or advanced technology allowing the tuning of one or more frequencies. The RF front end 206 may be configured to process signals, such as provided by an antenna 204, including RF signals (e.g., signal 110 of FIG. 1) obtained from network devices. As output, the RF front end 206 may provide data that is generally in the form of an analog or digitized baseband signal sent to the baseband processor 208.

In one example of the RF front end 206, a single frequency, e.g., a same channel center frequency, is utilized for RF communications by one or more of the nodes (e.g., nodes 102 of FIG. 1) of a network. In such an example, the RF front end 206 may tune or listen on a center frequency over a bandwidth as great as a widest bandwidth used by any supported protocol. In a second example of the RF front end 206, a plurality of channels and/or frequencies may be used, and the RF front end 206 may be configured to perform a frequency hopping functionality between the plurality of channels. In some applications, the RF front end 206 will be configured to tune between a channel utilized as a control channel and other channels utilized as data channels. Nodes may communicate in short conversations on the control channel, and agree to transfer data on one of the data channels. Thus, the RF front end 206 may be configured to perform frequency hopping over a plurality of channels defined within a bandwidth.

The baseband processor 208 may be configured to modulate and/or demodulate data heard on any channel tuned or transmitted by the RF front end 206. In particular, the baseband processor 208 may be configured for modulation and demodulation in accordance with one or more protocols required by one or more nodes 102 (as seen in FIG. 1).

The processing unit 112 may include a processor 114, a memory 116 and a clock 210. The clock 210 may be used to measure and/or time contention windows, frequency hopping, network and/or node functions, and the like.

The memory 116 may include a list 212. In one example, the list comprises one or more of: indications of parent nodes (e.g., by network ID); an associated contention window (CW) length; and a timeout associated with one or more of the contention windows. In one example, if a node has a single parent node, the list 212 might contain indications of the parent's name or network ID, indications of length of a contention window of the parent, and a timeout of the parent's contention window. The timeout is a period of time or an expiration time. Once the period has expired, or the expiration time has been reached, the contention window of the parent node becomes "stale," and is no longer considered by the node when calculating the node's own contention window. In one example, upon expiration of a contention window of a parent, the node may instead set its own contention window based on a CSMA/CA algorithm, without regard to the stale contention window of the parent node.

In some example implementations, the clock 210 may be a hardware device, while a timer 214 may be a program or module defined in memory 116, executable by the processor 114 and configured to utilize the clock, in conjunction with one or more algorithms, instructions, variables or flags. As such, the timer 214 may be programmed to utilize the clock 210 to time network events, including channel hopping, contention window(s), and the like.

A carrier sense multiple access with collision avoidance (CSMA/CA) algorithm 216 may be defined in memory 116, executable by the processor 114 and configured to calculate a "default" contention window for the node 200. In particular, the CSMA/CA algorithm 216 may calculate a contention window used in conventional nodes, and which is used only in certain circumstances by node 200.

A contention window size calculation module 218 may be defined in memory 116, executable by the processor 114 and configured to calculate a size (length and/or duration) of a contention window 220. In one example, the contention window size calculation module 218 obtains contention window(s) of the parent(s) from the list 212. If the timeout(s) associated with the contention window(s) indicate that the contention windows are still valid and/or "in effect," then it/they are used as input by the contention window size calculation module 218. Additionally, the contention window size calculation module 218 may obtain a contention window from the CSMA/CA algorithm 216 for use as input. This contention window, from the CSMA/CA algorithm, would be used by the node in a conventional network application. The contention window size calculation module 218 of node 200 then determines the larger of the contention windows used as input, and sets the contention window 220 for the node 200 as the larger of the input contention windows.

A contention window manager 222 may be defined in memory 116, executable by the processor 114 and configured for any of several purposes. For example, the contention window manager 222 may be configured to assist in the maintenance of the list 212. Additionally and/or alternatively, the contention window manager 222 may be configured to announce, in messages to neighbors, the size of the contention window 220 of the node, as calculated by the contention window size calculation module 218.

Example Contention Window Operation

Figure 3:
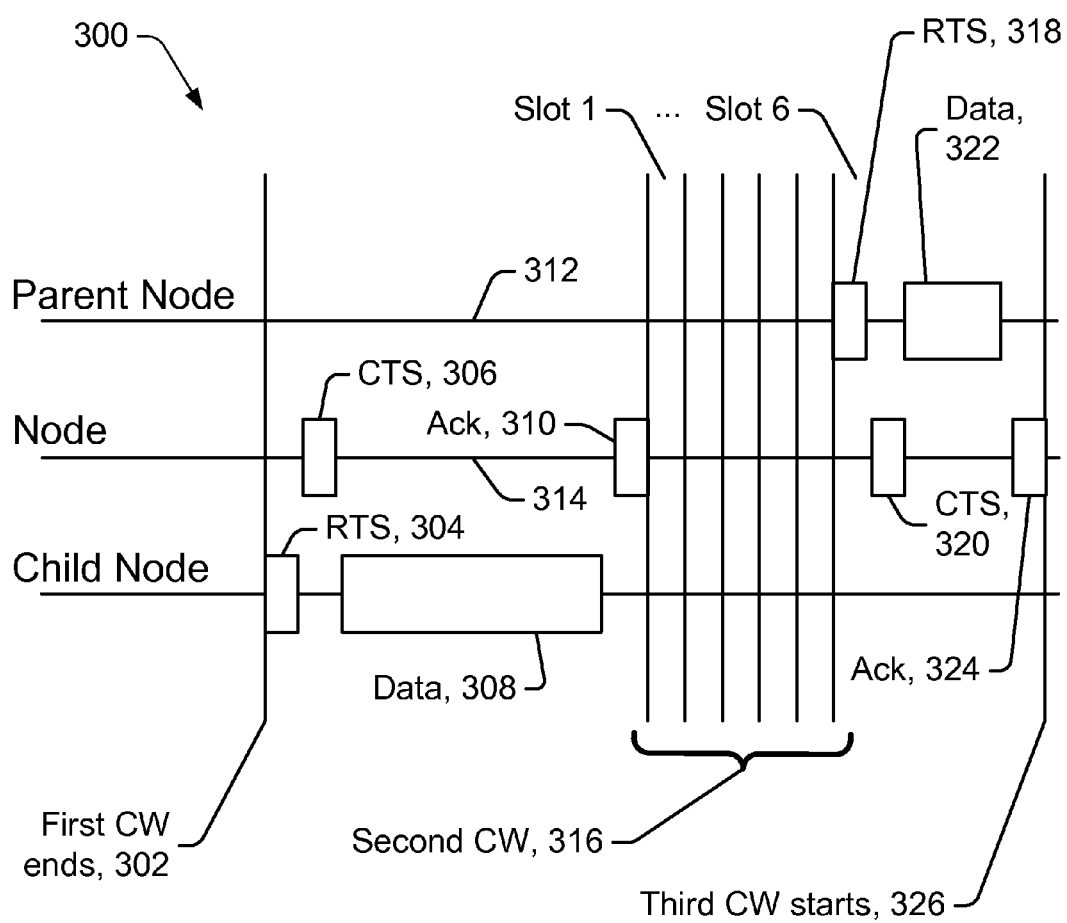
FIG. 3 is a timing diagram showing an example of how collisions are avoided by the example node configured as seen in FIG. 2.

FIG. 3 is a timing diagram 300 showing an example of how collisions of data packets transmitted over RF signals may be avoided. In one example, collisions are avoided by use and/or operation of the list 212, timer 214, CSMA/CA algorithm 216, contention window size calculation module 218 and contention window manager 222 of FIG. 2. The timing diagram 300 shows timelines associated with a node, its parent and its child. The node is upstream of the child node, but downstream of the parent node. In the example of FIG. 1, the parent is closer to the cellular router 102A and network 106. The example of FIG. 3 illustrates how the parent node is given priority, over the node, to transmit data by operation of the contention window functions 212-222 (as seen in FIG. 2). And in particular, how a node, by assigning itself a longer contention window than its parent, is able to give priority to the parent.

In the diagram 300, a first contention window 302 has just ended. The child node may have been alone among nodes wishing to transmit, and sends out a request-to-send (RTS) packet 304 to the node (which may be the parent of the child node). The node responds with a clear-to-send (CTS) packet 306. In response, the child node sends data 308. Upon conclusion of the transmission of the data 308, the node sends an acknowledgement 310.

During the transmission of the data 308, at times 312 and 314, the parent node and the node, respectively, both decide they have data they wish to transmit. Accordingly, the stage is set for differences in contention windows to avoid an RF collision. And further, the stage is set for the contention window setting functionality, seen in node 200 of FIG. 2, to give priority to the parent node. In the example of FIG. 3, the parent node wishes to transmit data to the node. However, the parent node could alternatively desire to transmit to another node, such as its parent node. Moreover, to avoid collisions, only one of the node and the parent node will be allowed to transmit after the conclusion of the child node's transmission. Accordingly, after the node provides an acknowledgement 310 of the child node's transmission, a second contention period 316 begins, which will determine who, between the node and parent node, is allowed to transmit next.

After the acknowledgement 310, transmission by all nodes stops. The next node allowed to transmit will be the node with the shortest contention period. Because all nodes have different contention periods, potential collisions are avoided. In the example of FIG. 3, after the parent node counts five empty time slots in the contention window, the parent node's contention window ends and it sends an RTS 318 to the node. The node, whose contention window has not yet timed out, realizes that this is not its turn to transmit. Accordingly, the node sends a CTS 320 to the parent node, indicating that the parent node is clear to send (i.e., to transmit). Accordingly, the parent node sends data 322. Upon conclusion of transmission of the data 322, the node sends an acknowledgment 324. In response to the acknowledgment 324, a third contention window starts 326.

Thus, FIG. 3 illustrates that the parent node and the node both desired to send data at the next opportunity—i.e., after the second contention window. However, because the node set its contention window to be longer than the contention window of its parent, the parent ended its contention window first, and sent RTS 318, thereby causing the node to have to wait until after a later contention window to send its data. From the network perspective, the behavior illustrated by FIG. 3 provides an advantage, in that upstream nodes are given priority, by having shorter contention windows, and are therefore more able to send data during heavy network traffic. For example, as network traffic approaches a root node of the network, the traffic is borne by nodes having shorter contention windows than downstream nodes. The shorter contention windows assist those nodes to transmit more frequently on busy links.

Example Methods

The example processes of FIGS. 4-8 can be understood in part by reference to the configurations of FIGS. 1-3. However, FIGS. 4-8 have general applicability, and are not limited by other drawing figures and/or prior discussion.

Each process described herein is illustrated as a collection of acts, blocks or operations in a logical flow graph, which represent a sequence of operations that can be implemented in hardware, software, or a combination thereof. The processes may include storing, in a memory communicatively coupled to a processor, computer-executable instructions for performing a method, such as a method of providing traffic load management for uplink network traffic, and executing the instructions on the processor.

In the context of software, the operations represent computer-executable instructions stored on one or more computer-readable storage media (e.g., memory 116 of FIGS. 1 and 2) that, when executed by one or more processors (e.g., processors 114 of FIGS. 1 and 2), perform the recited operations. Such storage media, processors and computer-readable instructions can be located within a system (e.g., system 100 of FIG. 1 or system 200 of FIG. 2) according to a desired design or implementation. The storage media 116 seen in FIGS. 1 and 2 is representative of storage media generally, both removable and non-removable, and of any technology. Thus, the recited operations represent actions, such as those described in FIGS. 4-8, and are taken under control of one or more processors configured with executable instructions to perform actions indicated. Generally, computer-executable instructions include routines, programs, objects, components, data structures, and the like that perform particular functions or implement particular abstract data types. The order in which the operations are described is not intended to be construed as a limitation, and the described operations may be combined in different orders and/or in parallel to implement the process. The above discussion may apply to other processes described herein.

The memory 116 may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

Additionally, for purposes herein, a computer-readable media may include all or part of an application specific integrated circuit (ASIC) or other hardware device. Such a hardware device may be configured to include other functionality, including functions providing traffic load management for uplink network traffic. Accordingly, within such an integrated circuit, one or more processors are configured with executable instructions, which may be defined by logic, transistors or other components, or on-board memory.

Example Uplink Network Traffic Load Management Methods

Figure 4:
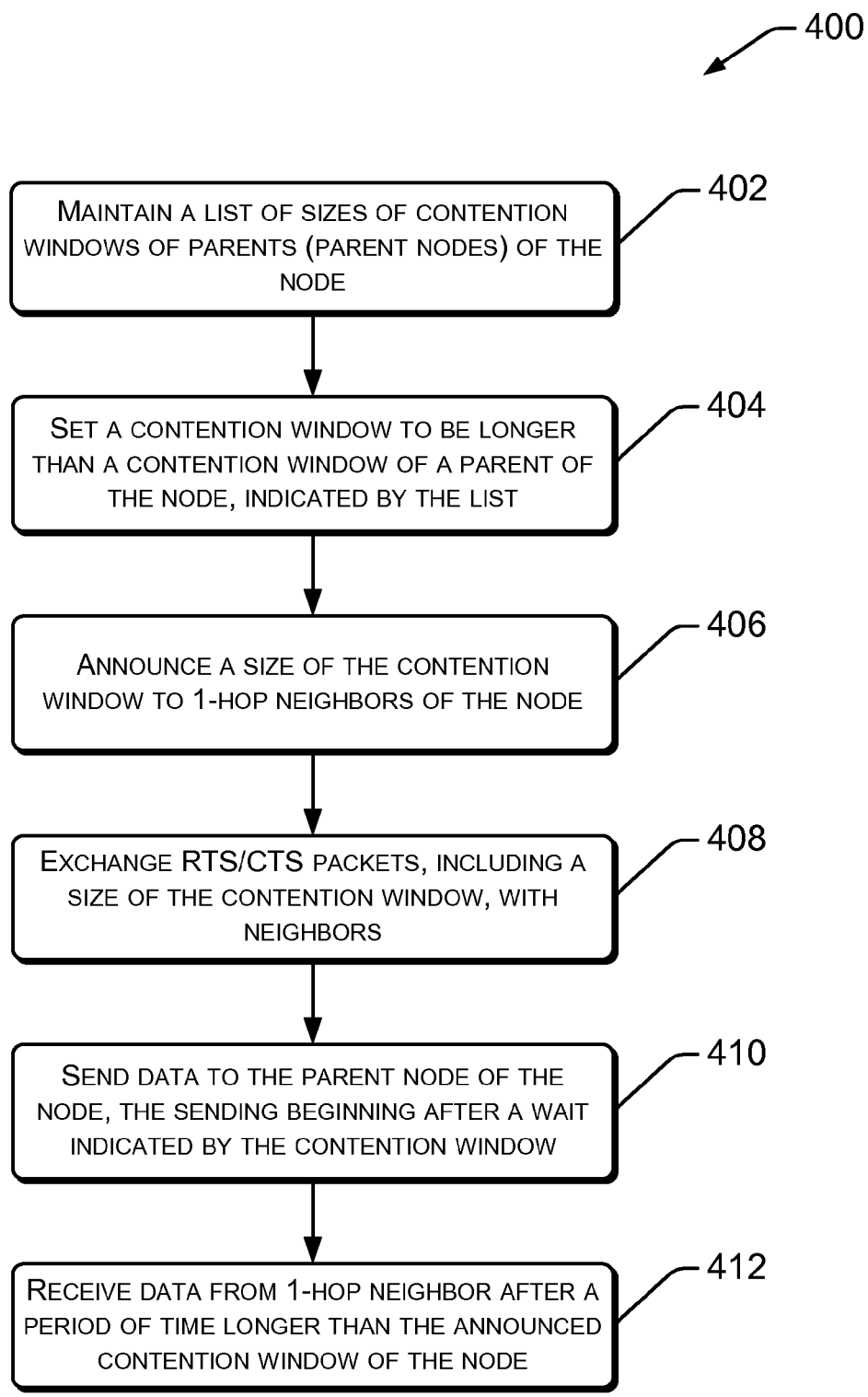
FIG. 4 is a flow diagram illustrating an example method by which uplink network traffic may be managed.

FIG. 4 is a flow diagram illustrating an example method 400 by which uplink network traffic may be managed. At operation 402, a node maintains a list, database, data structure and/or data store including information about parent node(s) of the node. In the example of FIG. 2, list 212 includes information about parent nodes, their contention windows and their expiration times and/or timeouts. The list may be maintained, for example, by the contention window manager 222. The list may include node or network IDs of the parent(s) of the node. The list may include a size or an indicator of a size of a contention window of one or more parent nodes in the list. Additionally, for each contention window, the list may include a timeout and/or expiration time of the contention window. After the timeout period has elapsed, or the expiration time has arrived, the contention window with which the timeout is associated is no longer considered valid and/or usable. Accordingly, the node may set its contention window to another value input to a contention window-setting algorithm. For example, the node may set its contention window to a CSMA/CA calculated value. The node may maintain the list by listening on a control channel when the node is not transmitting or receiving data on other channels. In particular, nodes may use the control channel to publish contention window information. Nodes may also use RTS and/or CTS packets to publish or declare contention window information.

At operation 404, a contention window may be set to be longer than a contention window of a parent of the node. Thus, a node, having maintained the list discussed at operation 402, may set a contention window to be longer than the contention windows of any, some or all of its parent(s). This tends to put the parent node(s) at an advantage, following conclusion of transmission over a channel, in that the parent of the node, having a shorter contention window, will have priority over the node when both want to use a channel/frequency. In the example of FIG. 2, the contention window size calculation module 218 may be used to perform operation 404.

At operation 406, a size of a contention window may be announced, at least to downstream 1-hop neighbors of the node. The downstream 1-hop neighbors may include nodes that are within the RF signal range of the node, i.e., nodes with which the node may communicate. The announcement of the contention window size of the node may be made particularly to child (downstream) nodes of the node, i.e., nodes that are downstream of the node. The announcement may be considered a publication, and may be used by receiving nodes to update their list (see operation 402). In the example of FIG. 2, the contention window manager 222 may be configured to perform operation 406. Note that while a node may set its contention window to be longer than contention windows of its parents, children of the node may also set their contention windows to be longer than the contention window of the node. Thus, downstream nodes may generally have longer contention windows, thereby assisting upstream nodes where a bottleneck is more likely.

At operation 408, the node may exchange RTS and/or CTS packets with another node. One or both such packets may include contention window size information. Thus, nodes listening on a control channel may overhear nodes disclose contention window size information. Having overheard that information, the node may update its list, if appropriate (e.g., as in operation 402).

At operation 410, data may be sent by a node to its parent node. The sending may begin after a wait indicated by the contention window. Because the node will have set its contention window to be longer than the parent node (see operation 404) the node will not transmit data to the parent if the parent needs the channel for transmission during the waiting period of the node.

At operation 412, data may be received by the node from a 1-hop neighbor, such as a child of the node. The receiving may begin after a period of time longer than the announced contention window of the node. Thus, if the node needs the channel for its own transmission, its own shorter contention window will allow it to begin using the channel before the 1-hop downstream neighbors (e.g., child nodes) will be able to begin use.

Figure 5:
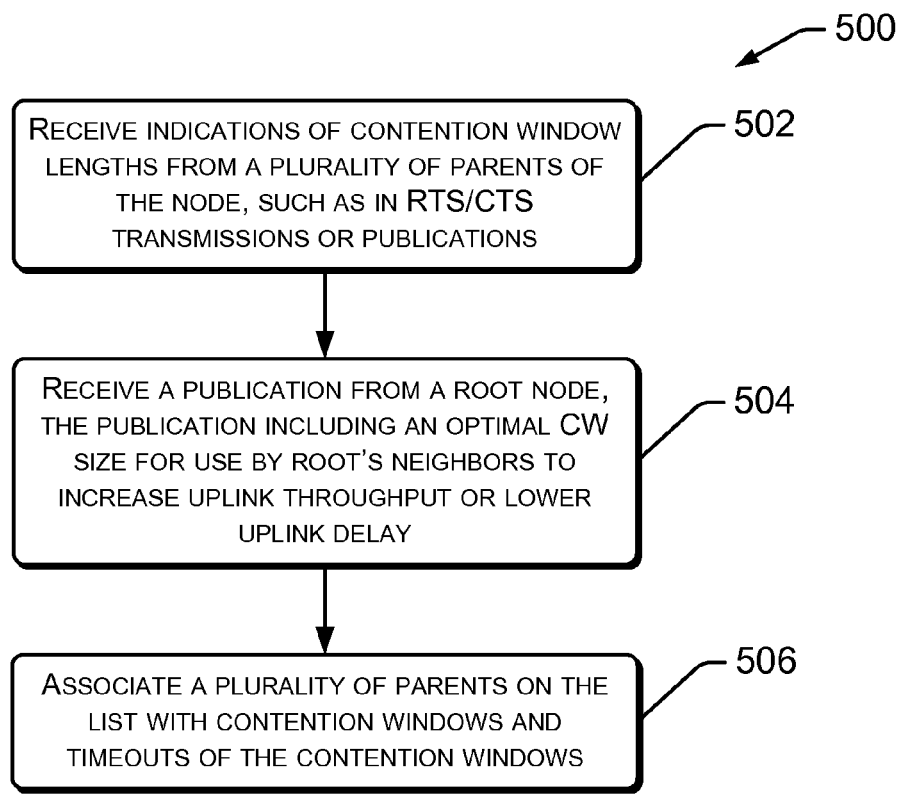
FIG. 5 is a flow diagram illustrating an example method by which information regarding contention windows of neighbor nodes may be managed.

FIG. 5 is a flow diagram illustrating an example method 500 by which information regarding contention windows of neighbor nodes may be managed. As such, method 500 provides an example and/or additional information on how contention window information may be obtained, and how the list 212 of FIG. 2 may be maintained, as discussed at operation 402 of FIG. 4. At operation 502, indications of contention window lengths may be received by a node from one or more parents of the node. The indications may be provided by publications, by RTS/CTS packets, or other packets expressly intended to transfer contention window size information, or the like.

At operation 504, a publication may be received from the root node that serves as a connection point of the ARA to a backhaul network (e.g., node 102A in FIG. 1). From the point of view of uplink communication, the root node is a unique upstream parent of all 1-hop neighbor nodes. Since the root node has no upstream parent, it will not maintain a contention window size for its own uplink communication. However, the root node may monitor uplink communications from all 1-hop neighbors and may calculate and/or optimize contention window size to be used by its neighbors that may increase or maximize the overall uplink throughput or minimize uplink delay. This computation may be done by the contention window size calculation module 218 in FIG. 2. The root node may then announce the optimal contention window size to all neighbor nodes. In one example, the contention window sizes announced by the root to a plurality of 1-hop downstream neighbors of the root are sized and/or calculated by the root to provide shorter contention windows to 1-hop neighbors of the root required to transmit more data and longer contention windows to 1-hop neighbors of the root required to transmit less data. The publication from the root node may be in addition, or as an alternative to, other means by which a node may receive contention window information. In the example of FIG. 2, the contention window manager 222 may receive and/or manage this publication.

At operation 506, a plurality of parents of a node, a plurality of contention windows (e.g., indications of contention window times), and a plurality of timeouts for the contention windows, respectively, may be organized into a list. In the example of FIG. 2, the list 212 may be maintained by the contention window manager 222, or the like.

Figure 6:
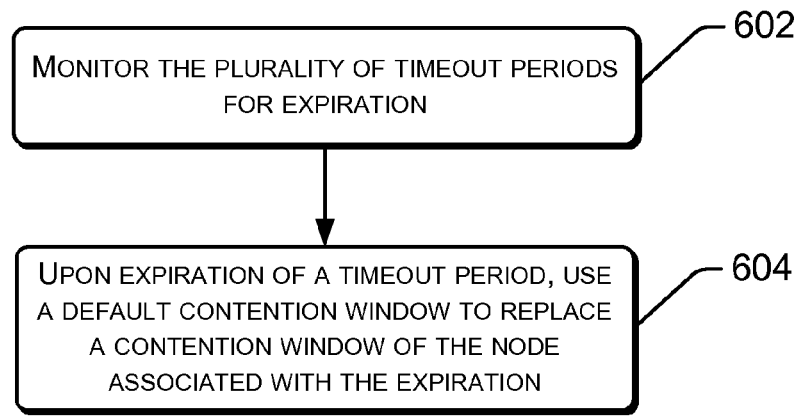
FIG. 6 is a flow diagram illustrating an example method by which timeout periods of contention windows of other nodes may be managed.

FIG. 6 is a flow diagram illustrating an example method 600 by which timeout periods of contention windows of other nodes may be managed. As such, method 600 provides an example and/or additional information on how contention window information may be expired and maintained in list 212 of FIG. 2, as discussed at operation 402 of FIG. 4. In general, a contention window is used only prior to expiration of its timeout period. The contention window is not used following the timeout period, which may be expressed as a countdown period or a date and time, or the like. Because the contention window is not used, another input to the contention window size calculation module 218 (see FIG. 2) may be used instead. For example, the contention window calculated by the CSMA/CA algorithm 216 may be used.

At operation 602, one or more contention window timeout periods is monitored for expiration. This may include counting down the timeout periods or watching for arrival of a time wherein the contention window is expired.

At operation 604, a default contention window is used upon expiration of a timeout period. The default contention window may be used in any algorithm configured to select a contention window for the node. In the example of FIG. 2, the list 212 may be used to record parent node ID, contention window size and contention window timeout. The contention window size calculation module 218 may manage the list 212 and determine if a contention window of a parent node has expired. If expired, the contention window size calculation module 218 may instead use of a contention window provided by, for example, the CSMA/CA algorithm as a default.

Figure 7:
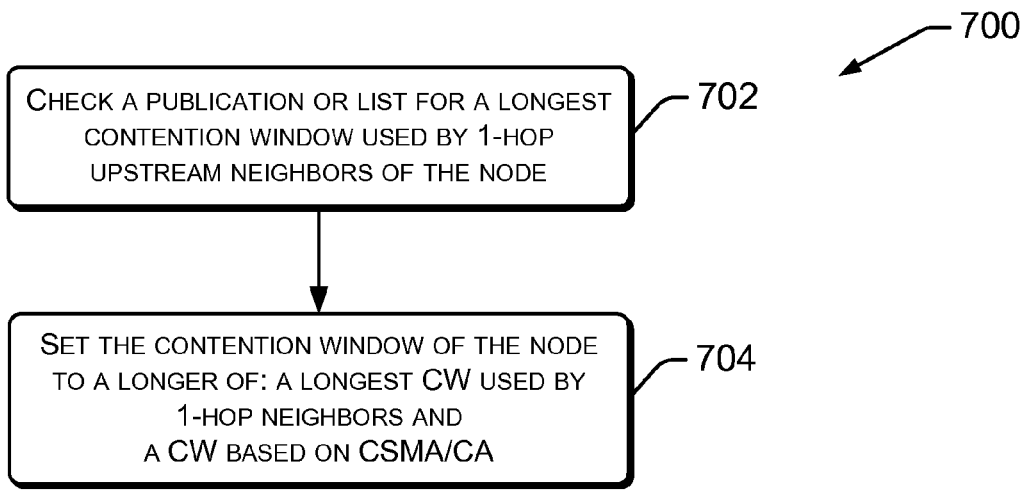
FIG. 7 is a flow diagram illustrating an example method by which a node may set its own contention window, using as input indications of contention windows from other nodes.

FIG. 7 is a flow diagram illustrating an example method 700 by which a node may select its own contention window, using as input indications of contention windows from other nodes. As such, method 700 provides an example and/or additional information on how contention windows may be selected, as discussed at operation 404 of FIG. 4. In general, method 700 provides for selection of a contention window for a node that is longer than 1-hop upstream neighbors (e.g., parents) of the node.

At operation 702, a publication received by a node, or the list (e.g., list 212 of FIG. 2) maintained by the node, is consulted, and indications of (e.g., information about) contention windows of 1-hop upstream neighbors of the node are obtained.

At operation 704, the contention window of the node is set as long as, or longer than, the longest of: a longest contention window used by 1-hop upstream neighbors of the node; and, a contention window based on a CSMA/CA algorithm. In one example, only 1-hop upstream neighbors that are parents of the node are considered. In another example, expiration of the contention windows of 1-hop upstream neighbors are considered.

Figure 8:
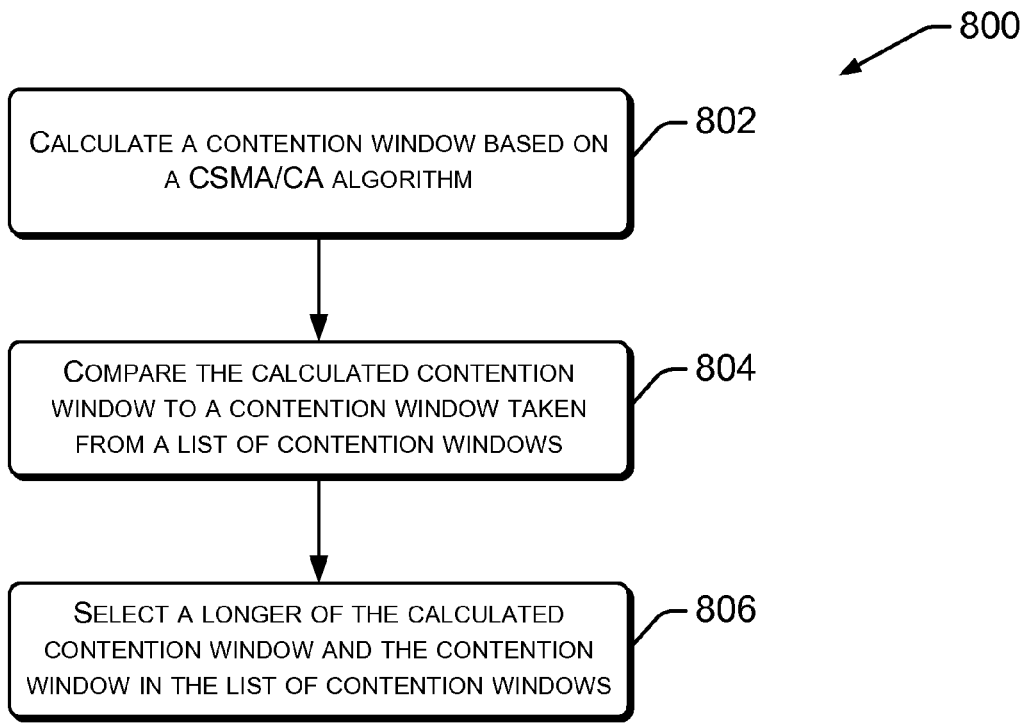
FIG. 8 is a flow diagram illustrating a further example method by which a node may set its own contention window, using as input indications of contention windows from other nodes.

FIG. 8 is a flow diagram illustrating a further example method by which a node may select its own contention window, using as input indications of contention windows from other nodes. As such, method 800 provides an example and/or additional information on how contention windows may be selected, as discussed at operation 404 of FIG. 4. In general, method 800 provides for selection of a contention window for a node that is longer than known upstream neighbors and/or parents. For example, a contention window that is equal to, or longer than, 1-hop upstream neighbors (e.g., parents) of the node, and equal to, or longer than, a CSMA/CA default contention window, may be selected.

At operation 802, a contention window is calculated based on a default algorithm, such as the CSMA/CA algorithm. Such an algorithm may be used in known networks, to set a contention window of a node. At operation 804, the contention window obtained from the CSMA/CA algorithm is compared to one or more contention windows taken from a list of contention windows (e.g., list 212 of FIG. 2). The list may include contention windows of the node's parents, upstream neighbors, 1-hop neighbors, and the like. At operation 806, a contention window as long as, or longer than, the contention windows in the comparison of operation 804 is selected. Accordingly, the node is configured with a contention window that is not shorter than it parents and/or 1-hop upstream neighbors.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of controlling a size of a contention window in a node in a network, comprising:
 under control of one or more processors configured with executable instructions:
 maintaining a list of sizes of contention windows of parent nodes of the node;
 setting a contention window for the node to be not shorter than a contention window of a parent node of the node and longer than contention windows used by upstream 1-hop upstream neighbors of the node, as indicated by the list; and
 sending data to the parent node of the node, the sending beginning after a wait indicated by the contention window of the node.

2. The method of claim 1, wherein:
 maintaining the list includes:
 associating a plurality of parents on the list with a plurality of contention windows, respectively, and a plurality of timeout periods, respectively, each timeout period governing expiration of an associated contention window; and
 setting the contention window includes:
 monitoring the plurality of timeout periods for expiration; and upon expiration of a timeout period, using a default contention window to replace a contention window associated with the expired timeout period.

3. The method of claim 1, wherein:
maintaining the list of sizes of contention windows comprises:
receiving a publication from a root node; and
setting the contention window comprises:
checking the publication for a longest contention window used by upstream 1-hop neighbors of the node; and
setting the contention window to be a longer of:
a longest contention window used by upstream 1-hop neighbors of the node; and
a contention window based on a carrier sense multiple access with collision avoidance (CSMA/CA) algorithm.

4. The method of claim 1, wherein setting the contention window comprises:
calculating a contention window based on a carrier sense multiple access with collision avoidance (CSMA/CA) algorithm;
comparing the calculated contention window to a contention window in the list of sizes of contention windows; and
selecting a longer of the calculated contention window and the contention window in the list of sizes of contention windows.

5. The method of claim 1, wherein setting the contention window comprises:
expiring a contention window from the list according to its timeout period; and
setting the contention window of the node to not be shorter than parents of the node using non-expired portions of the list as input.

6. The method of claim 1, additionally comprising:
exchanging RTS and CTS packets with neighbors of the node; and
including a size of the contention window in the exchange.

7. The method of claim 1, additionally comprising:
receiving data from a child node of the node, wherein the data is received on a channel following a period of time after the channel became clear, the period of time being longer than the contention window of the node;
wherein sending data to the parent node of the node, includes sending on a second channel following a second period of time after the second channel became clear, the second period of time being longer than an announced contention window of the parent node.

8. The method of claim 1, additionally comprising:
announcing a size of the contention window of the node to 1-hop neighbors of the node; and
receiving data from a downstream 1-hop neighbor node on a channel, wherein the data was received following a period of time after the channel became clear, the period of time being longer than the announced contention window size.

9. A node in a network, comprising:
a processor;
memory, in communication with the processor;
a list, defined in the memory and including indications of parents of the node, a size of a contention window associated with each parent, and a timeout associated with each contention window;
a timer to manage the timeouts in the list;
a contention window size calculation module, defined in the memory and configured to calculate a size of a contention window of the node, using as input:
a carrier sense multiple access with collision avoidance (CSMA/CA) algorithm; and
data from the list;
wherein the size of the contention window of the node is determined by comparing the input; and
a contention window manager defined in memory and configured to announce, in messages to neighbors, the size of the contention window of the node, as calculated by the contention window size calculation module.

10. The node of claim 9, wherein the contention window size calculation module is additionally configured to:
associate a plurality of parents on the list with a plurality of timeout periods, respectively, each timeout period governing expiration of an associated contention window;
monitor the plurality of timeout periods for expiration; and
upon expiration of a timeout period from among the plurality of timeout periods, use a default contention window to replace a contention window associated with the expired timeout period.

11. The node of claim 9, wherein the contention window size calculation module is additionally configured to:
calculate a contention window based on a CSMA/CA algorithm;
maintain the list using a publication from a root node;
compare the calculated contention window to a contention window in the list; and
select a longer of the calculated contention window and the contention window in the list.

12. The node of claim 9, wherein the contention window size calculation module is additionally configured to:
calculate the size of the contention window of the node based in part on an indication of a size of a contention window from a root of the network, if the root is located 1-hop upstream of the node, wherein the indication of the size of the contention window from the root is based in part on indications of sizes of contention windows sent to other 1-hop neighbors of the root.

13. The node of claim 9, wherein the contention window manager is additionally configured to:
announce the size of the contention window to 1-hop downstream neighbors of the node;
wherein data is received from a downstream 1-hop neighbor on a channel following a period of time after the channel became clear, the period of time being greater than the announced contention window size.

14. A method of controlling a size of a contention window in a node in a network, comprising:
under control of one or more processors configured with executable instructions:
exchanging RTS and CTS packets with neighbors of the node;
including a size of the contention window in the exchange;
maintaining a list of sizes of contention windows of parent nodes of the node, wherein the sizes of contention windows are obtained in part from the exchange;
setting a contention window for the node to be not shorter than a contention window of a parent node of the node, as indicated by the list; and
sending data to the parent node of the node, the sending beginning after a wait indicated by the contention window of the node.

15. The method of claim 14, wherein:
maintaining the list includes:
- associating a plurality of parents on the list with a plurality of contention windows, respectively, and a plurality of timeout periods, respectively, each timeout period governing expiration of an associated contention window; and setting the contention window includes:
- monitoring the plurality of timeout periods for expiration; and
- upon expiration of a timeout period, using a default contention window to replace a contention window associated with the expired timeout period.

16. The method of claim 14, wherein:
maintaining the list of sizes of contention windows comprises:
- receiving a publication from a root node; and setting the contention window comprises:
- checking the publication for a longest contention window used by upstream 1-hop neighbors of the node; and
- setting the contention window to be a longer of:
  - a longest contention window used by upstream 1-hop neighbors of the node; and
  - a contention window based on a carrier sense multiple access with collision avoidance (CSMA/CA) algorithm.

17. The method of claim 14, wherein setting the contention window comprises:
- calculating a contention window based on a carrier sense multiple access with collision avoidance (CSMA/CA) algorithm;
- comparing the calculated contention window to a contention window in the list of sizes of contention windows; and
- selecting a longer of the calculated contention window and the contention window in the list of sizes of contention windows.

18. The method of claim 14, wherein setting the contention window comprises:
- setting the contention window to be longer than contention windows used by upstream 1-hop upstream neighbors of the node.

19. The method of claim 14, wherein setting the contention window comprises:
- expiring a contention window from the list according to its timeout period; and
- setting the contention window of the node to not be shorter than parents of the node using non-expired portions of the list as input.

20. The method of claim 14, additionally comprising:
- receiving data from a child node of the node, wherein the data is received on a channel following a period of time after the channel became clear, the period of time being longer than the contention window of the node;
- wherein sending data to the parent node of the node, includes sending on a second channel following a second period of time after the second channel became clear, the second period of time being longer than an announced contention window of the parent node.

* * * * *